United States Patent [19]

Condevaux et al.

[11] Patent Number: 4,470,232
[45] Date of Patent: Sep. 11, 1984

[54] MODULAR ASSEMBLY FOR CONSTRUCTING AN EXHIBITION STAND

[75] Inventors: Georges Condevaux, Paris; Gérard Comte, Bagnolet, both of France

[73] Assignees: Enterprises Electriques Mors-Jean et Bouchon, Paris; Societe Francaise d'Expositions, Bagnolet, both of France

[21] Appl. No.: 331,266

[22] Filed: Dec. 16, 1981

[30] Foreign Application Priority Data

Jun. 25, 1981 [FR] France .................. 81 12517

[51] Int. Cl.³ .................. E04B 2/00; E04F 17/08
[52] U.S. Cl. .................. 52/220; 52/242
[58] Field of Search .................. 52/220, 221, 235, 407, 52/238, 311, 242; 174/48, 49

[56] References Cited

U.S. PATENT DOCUMENTS

| | | |
|---|---|---|
| 1,718,252 | 6/1929 | Putnam . |
| 1,718,253 | 6/1929 | Putnam . |
| 1,798,280 | 3/1931 | Sorensen .................. 52/242 |
| 2,000,243 | 5/1935 | Manske .................. 52/220 |
| 2,187,408 | 1/1940 | Thumm .................. 52/220 |
| 2,399,978 | 5/1946 | Bartholomew .................. 52/220 |
| 2,808,136 | 10/1957 | Hammitt et al. .................. 52/220 |
| 2,934,180 | 4/1960 | Hammitt et al. .................. 52/220 |
| 3,159,882 | 12/1964 | Slayter .................. 52/407 |
| 3,293,813 | 12/1966 | Emmons et al. .................. 52/238.1 |
| 3,321,878 | 5/1967 | Brown et al. .................. 52/220 |
| 3,377,756 | 4/1968 | Polhamus .................. 52/220 |
| 3,611,653 | 10/1971 | Zinn .................. 52/407 |
| 4,032,821 | 6/1977 | Keiser .................. 174/48 |
| 4,067,165 | 1/1978 | Timmons .................. 52/238 |
| 4,214,799 | 7/1980 | Biche .................. 174/48 |
| 4,232,183 | 11/1980 | Person .................. 174/48 |
| 4,239,932 | 12/1980 | Textoris et al. . |
| 4,270,020 | 5/1981 | Kenworthy et al. . |
| 4,308,418 | 12/1981 | Van Kuik et al. .................. 174/48 |

OTHER PUBLICATIONS

Sweets Catalog File; 1979, 11.27 a/Fr., p. 42; 11.27 a/Ger., p. 39.

Primary Examiner—John E. Murtagh
Assistant Examiner—Michael Safavi
Attorney, Agent, or Firm—Pearne, Gordon, Sessions, McCoy, Granger & Tilberry

[57] ABSTRACT

The invention relates to a modular assembly for the construction of an exhibition stand comprising at least one panel fixed to at least one post resting by their bases on an installation area, wherein the base of the panel rests on the installation area by means of at least one hollow profiled member whose base is fixed to the panel and can receive at least one pipe carrying a fluid, as well as electrical signal conductors, whereby at least the base of the post is hollow facing the base hollowed profile member of the panel to permit connection to pipes or other panels or the connection of said pipes to other pipes, as well as the connection between conductors of other panels or the connection of these conductors to other conductors.

3 Claims, 8 Drawing Figures

MODULAR ASSEMBLY FOR CONSTRUCTING AN EXHIBITION STAND

BACKGROUND OF THE INVENTION

The present invention relates to a modular assembly for the construction of an exhibition stand. The invention more particularly applies to the construction of modular assemblies for exhibition stands, e.g. for use in exhibitions and fairs where numerous stands have to be provided for the different exhibitors. This modular assembly permits a very rapid construction and, due to its design, obviates the need for digging trenches in the ground of the exhibition area or for constructing special floors for the passage of fluid circulation pipes and conductors carrying electrical signals.

It is known that stands used in exhibitions are generally constituted by vertical panels joined to posts. These panels and posts rest on the floor. This floor can be directly laid on the ground over trenches containing pipes carrying gaseous or liquid fluids, such as compressed air or water, as well as conductors carrying electrical signals. These conductors may supply voltages required for the equipment exhibited as well as for the light fittings on the stands but, for example, they may also be used for the transmission of telephone signals.

The floor may optionally be raised relative to the exhibition surface area by means of small horizontal girders or beams, so as to permit the passage of the conductors and pipes between said girders or beams and the floor or ground.

The known exhibition stands have serious disadvantages. When the floor is laid over trenches for the passage of pipes and electrical conductors, said trenches have fixed locations making the relative positioning of the various stands more difficult. The trenches can naturally be dug as a function of the desired arrangement of the various stands, but the main disadvantage of this idea is that they have to be dug before each exhibition, which is very onerous and restrictive.

There is no need to dig trenches in the case of raised floors, but the latter are more expensive than floors laid directly on the exhibition surface area and in addition the pipes for carrying fluids and the electrical conductors can only be installed progressively by different groups of workers until the last moment, i.e. shortly before the panels delimiting each stand are installed.

Finally, and no matter what the adopted construction mode, i.e. using trenches below the floor or with a raised floor, the pipes carrying the fluids and the electrical conductors are visible. It is also necessary to provide means for fixing these pipes and conductors to the panels.

BRIEF SUMMARY OF THE INVENTION

The object of the present invention is to obviate these disadvantages and more particularly to provide a modular assembly for the construction of an exhibition stand with which the aforementioned disadvantages do not occur. This modular assembly can be easily and rapidly installed, rests directly on the exhibition surface area without it being necessary to provide, beneath the floor, trenches for the passage of pipes carrying fluids and electrical conductors and without it being necessary to provide a raised floor for the passage of said pipes and conductors. Moreover, as a result of the invention, the pipes and conductors can be integrated into the different partitioning panels of each stand before the said panels are installed on the stand, without it being necessary after the installations of said panels to fix the pipes and conductors thereto. Finally, as a result of the modular assembly according to the invention, the pipes and conductors are hidden over most of each of the panels.

The present invention specifically relates to a modular assembly for the construction of an exhibition stand comprising at least one panel fixed to at least one post resting by their bases on an installation area, wherein the base of the panel rests on the installation area by means of at least one hollow profiled member whose base is fixed to the panel and can receive at least one pipe carrying a fluid, as well as electrical signal conductors, whereby at least the base of the post is hollow facing the base hollowed profile member of the panel to permit connection to pipes of other panels or the connection of said pipes to other pipes, as well as the connection between conductors of other panels or the connection of these conductors to other conductors.

According to another feature of the invention, the modular assembly also comprises at least one upper hollow profiled member located in the upper part of the panel in order to at least permit the passage of electrical signal conductors, the post being a hollow member in order to at least permit the passage of electrical signal conductors, as well as connections between conductors contained in said post and conductors contained in the base hollow members and conductors contained in the upper hollow members.

According to another feature of the invention, each base hollow member comprises at least one partition subdividing the hollow member into a first lower part containing the pipes and a second upper part containing the electrical conductors.

According to a special feature, the panel has two large vertical faces and at least one of these comprises vertical columns for the fitting of object supports.

According to another feature, at least one of the panel faces is covered with a detachable covering fixed to the base hollow member and the upper hollow member.

According to another feature, the detachable covering is a plate enveloped with a decorative surface layer.

According to another feature, the decorative surface layer is interchangeable.

According to another feature, at least the base hollow member of the panel comprises at least one vertical partition subdividing the first and second lower and upper parts of said member in order to separate the pipes and electrical conductors for each of the panel faces.

According to another feature, the pipes and electrical conductors are installed in hollow members and the post before installing the modular assembly on the exhibition area.

According to another feature, the modular assembly also comprises assembly means for each panel for assembling the latter with a post and rapid connection means for the conductors and pipes at the end of each panel.

According to another feature, both the base and upper hollow members are sealed by a cover.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
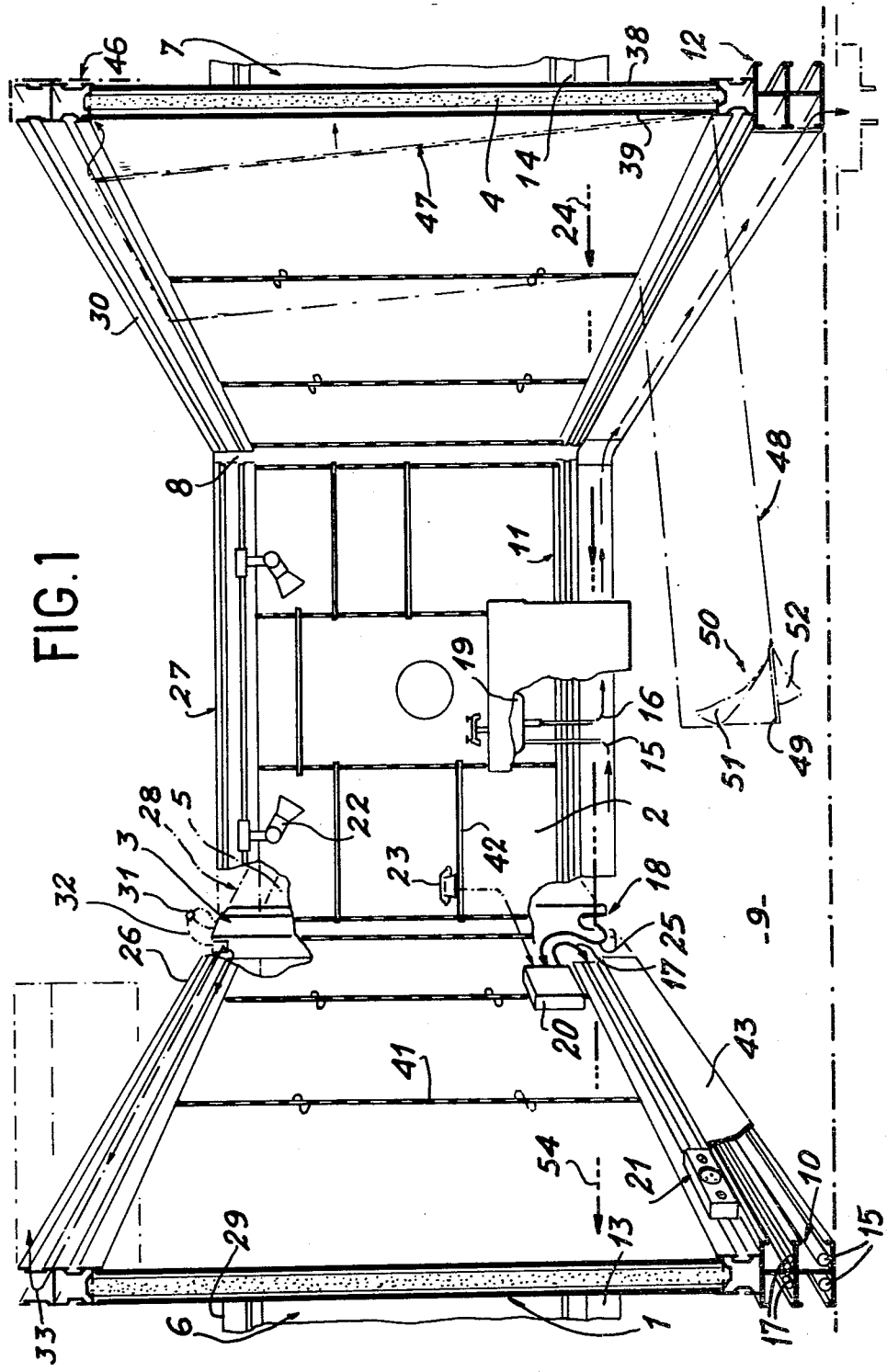
FIG. 1 diagrammatically and in perspective a modular assembly according to the invention.

FIG. 1 diagrammatically shows a modular assembly for the construction of the exhibition stand according to the invention. This modular assembly comprises two panels 1, 2 fixed to a post 3. It may also comprise other panels 4, 5, 6, 7, as well as other posts, such as e.g. post 8. These posts and panels rest by their base on an installation surface area 9. The different panels respectively rest on installation area 9 by means of base hollow profiled members 10, 11, 12, 13, 14, etc, which are fixed thereto. Each of the said members may contain one or more pipes 15, 16 carrying a fluid such as air for example, as well as electrical signal conductors 17. The base 18 of each post is hollow facing the base hollow profiled members in order to permit connections between the pipes of the different panels and the connection between these pipes and other pipes, as well as the connection between conductors of two panels or the connection of these conductors with other conductors, as will be shown in greater detail hereinafter. Preferably, the panels are made from a rigid material, such as agglomerated wood, whilst the hollow profiled members are made e.g. from aluminium. The pipes such as 15 and 16, shown in exemplified manner in the drawing, make it possible to respectively supply the wash basin 19 or remove dirty water therefrom. It is obvious that the said pipes carrying water in the chosen example can also carry gaseous fluids such as compressed air. These pipes are located within base hollow profiles in the lower part thereof, whilst the electrical conductors 17 are located in the upper part of said base hollow profiles. For example, these electrical conductors supply from a switchbox 20 power points such as 21 or light fittings 22, in the manner to be shown hereinafter. They also supply the telephone 23. It is assumed in the present drawing that the switchbox 20 is supplied by an electrical line 24. This line leads to the base hollow part of post 3, the distribution of the electric signals up to switchbox 20 being carried out by a not shown connector located in the base 18 of the post and by cable 25. It is obvious that the aforementioned connector can also distribute the electric signals by a line 54 in other panels, such as e.g. panel 6.

For each panel, this modular assembly also comprises an upper hollow profiled member, the latter being shown for the different panels at 26, 27, 28, 29, 30 etc. As will be shown in greater detail hereinafter, each post 3 is a hollow member permitting the passage of electrical signal conductors in the direction of the upper hollow profiled members. As in the lower part of the device, connectors 31 make it possible to connect the conductors 32 contained in post 3 to conductors 33 located in the upper hollow profiles. Obviously, the conductors 32 contained in post 3 are connected by not shown means to other conductors in the base of post 3. The conductors 33 contained in the upper profiles can obviously be connected to other conductors contained in upper profiles of other panels or to other conductors contained in post 3.

The upper and base hollow members can be sealed by covers, such as covers 43, 46.

Figure 2:
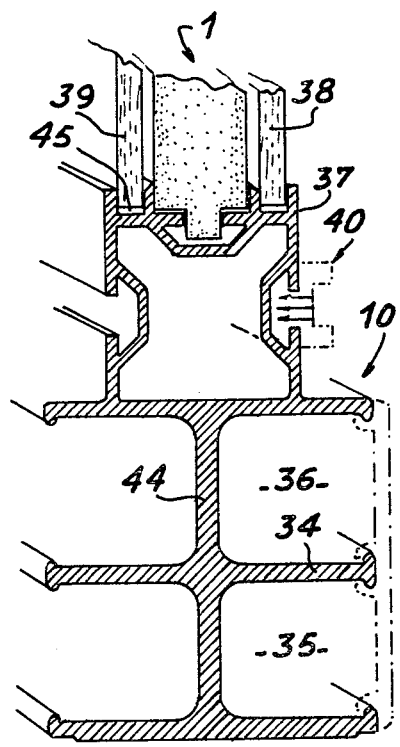
FIG. 2 diagrammatically, the hollow profiled member located at the base of each panel of the assembly.

FIG. 2 diagrammatically shows in a perspective view the base hollowed profile member 10. The latter have at least one partition 34 subdividing the hollow member into a first lower part 35 housing the fluid transfer pipes (not shown in the drawing) and a second upper part 36 housing the electrical conductors (not shown in the drawing). This base profiled member is surmounted by a support 37 having a shape enabling it to support panel 1, as well as detachable coverings 38, 39, each of which covers faces of the said panels. These coverings will be described in greater detail hereinafter. As is shown in FIGS. 1 and 2, the base hollow member 10 and the upper hollow member 26 have a shape making it possible to fix electrical components, such as power points 40, light fittings 22, etc. These power points and light fittings are obviously connected to conductors contained in the hollow parts of the base and upper profiles. FIG. 1 shows vertical columns 41 arranged on one or both faces of each panel and which by means of an e.g. rack configuration make it possible to fit object supports such as switchbox 20, support 42 of telephone 23, the telephone switch or the support for washbasin 19.

As shown in FIG. 2, each base hollow member supporting each panel may also comprise at least one vertical partition 44 making it possible to subdivide the first and second lower and upper parts 35, 36 so as to separate the pipes and electrical conductors relative to each of the faces of panel 1.

FIG. 1 also shows on each of the faces of each panel, the detachable covers 38, 39 integral with the base hollow member 12 and the upper hollow member 30, e.g. for panel 7. These detachable coverings are fixed to the said hollow members by means of grooves such as 45 (FIG. 2) made in the hollow members. The fitting of the detachable covering is shown at 47, whilst at 48 it is possible to see the structure of said covering in a more detailed manner. The covering is in fact constituted by a plate 49 enveloped in a decorative surface layer 50, each of whose faces 51, 52 can be given a different colouring. In this way, it is possible, by simply turning over the detachable covering, to change the appearance of the stand. Plate 49 is a rigid plate made from a laminated material or e.g. plastic. The decorative surface layer 50 is also interchangeable, so that it can easily be replaced and optionally other colours can be used.

The fitting of the posts and partitions, as well as the pipes and conductors contained in the posts and base and upper hollow members will be described in greater detail hereinafter. The pipes and electrical conductors are placed in the posts and in the base and hollow members before the installation of the modular assembly on the exhibition area, so that at the time of installing the assembly, only the high-speed connections have to be made. As will be shown in greater detail hereinafter, the modular assembly also comprises assembly means for each panel for the purpose of assembling the panels and the posts. It also comprises means for connecting the conductors and means for connecting the pipes at the end of each panel.

Figure 3:
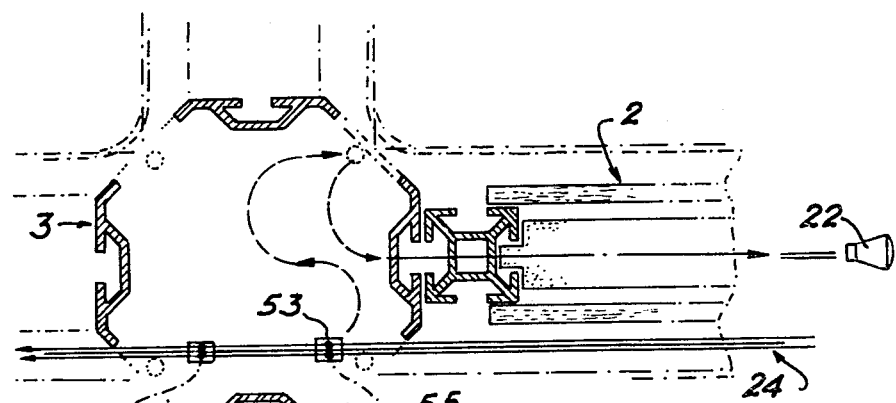
FIG. 3 in more detailed manner, the assembly of a post and two panels.
Figure 3:
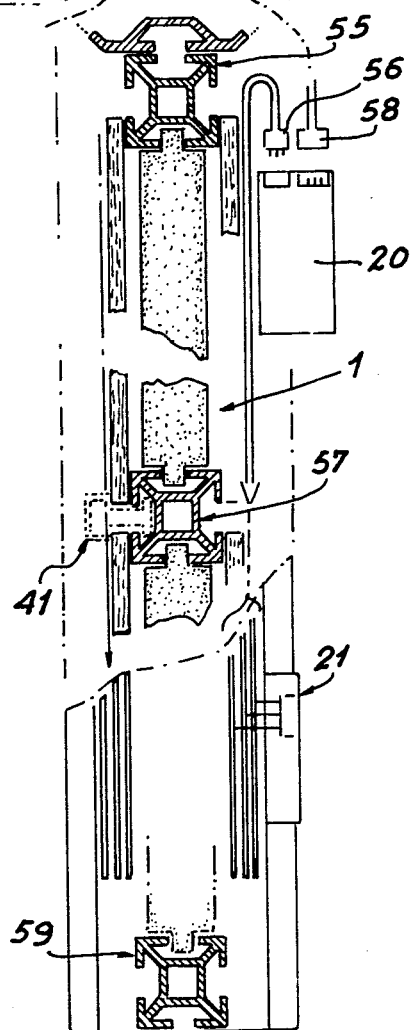

FIG. 3 shows in more detailed manner, the installation of panels 1 and 2 and posts 3 of FIG. 1. The same elements carry the same references as in FIGS. 1 and 2. FIG. 3 also shows in greater detail a number of electrical conductors, which can be placed in upper and lower hollow members of each of the panels. It is obvious that this electrical installation is in no way limitative. For example, cable 24 supplies telephone or electric signals in the direction of panels 1 or 2. This cable is obviously located in the upper part of the base hollow member of panel 2. Connectors such as 53 located at the base of post 3 make it possible to provide branches in the direction of switchbox 20, in the direction of other panels or in the direction of conductors located in the upper hollow members by means of conductors located in posts 3, e.g. for supplying light fittings such as 22 (FIG. 1). Obviously, at the end of each panel, the conductors are contained in the base and upper hollow members and are provided with high-speed connection means, e.g. power point 56. The conductors coming from post 3 and which supply switchbox 20 are also provided with power points 58. These power points are in particular provided for the electrical signals in order to respect the safety standards. Thus, the power point 58 supplying switchbox 20 is a socket, whilst power point 56 supplying the conductors of panel 1 from said switchbox is a plug. The drawing also shows at the end of each panel and within the latter, profiles 55, 57, 59 making it possible to increase the strength of these panels and which also support vertical columns 41 for fitting object supports. It is also possible to see the power point 21 fixed to the base hollow member of panel 1.

Figure 4:
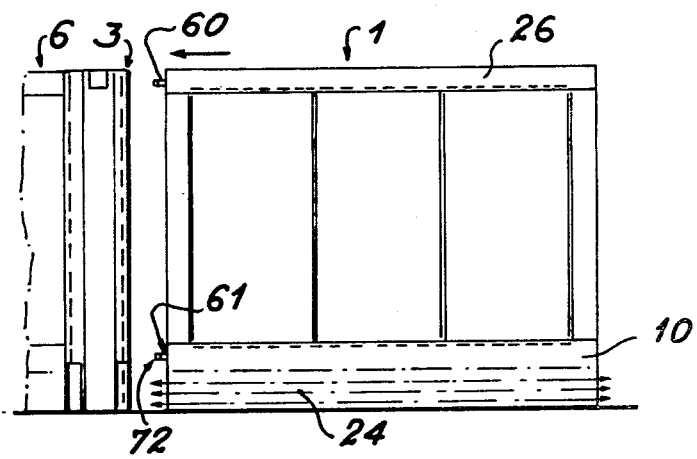
FIG. 4 the location of the fixing means between a post and a panel.

FIG. 4 shows diagrammatically panels 1 and 6 and post 3, as well as fixing means 60, 61 located at the ends of the base and upper hollow members 10 and 26 respectively enabling panel 1 and post 3 to be fixed together. The drawing also diagrammatically shows electrical conductors 24.

Figure 5:
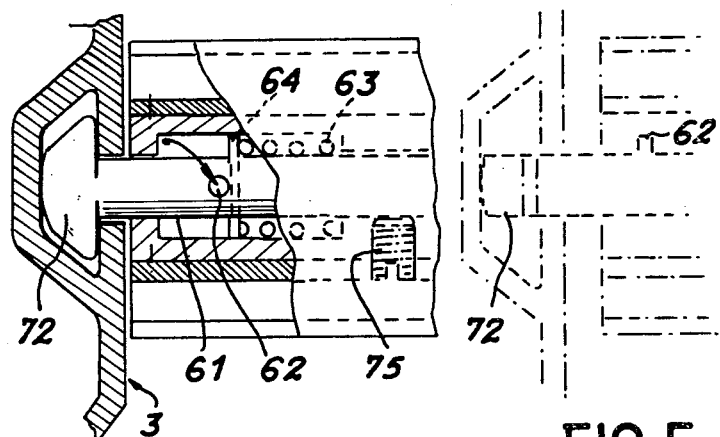
FIG. 5 in more detailed manner, one of the said fixing means.

FIG. 5 shows in detailed manner one of the fixing means enabling one of the panels to be fixed to post 3. These fixing means are described in French patent application Nos. 71 24863 and 73 45532. They are essentially constituted by a spindle 61 provided with a head 72 engaging in the trapezoidal groove of post 3. The initial position of this head before joining the panel to post 3 is shown by dotted lines to the right of the drawing. Spindle 61 is provided with a lug 62 which, at the time when the panel is pressed against the post, bears on a not shown cam enabling head 72 to be pivoted by 90°, so as to lock the panel. A spring 63 bears on a flange 64 of spindle 61 so as to force head 72 towards the outside of the panel before fitting the latter to post 3. A screw 75 makes it possible to complete the locking, when the panel is already fitted against the post.

Figure 6:
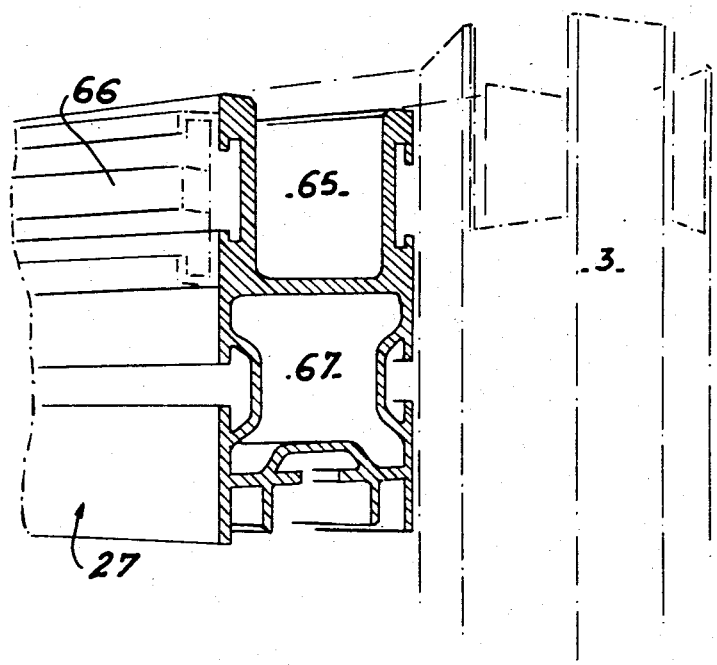
FIG. 6 diagrammatically, an upper hollow member at the top of each panel.

FIG. 6 shows in more detailed manner one of the upper hollow members 27. The said hollow member is in fact constituted by two integral parts. Upper part 65 serves to contain electrical conductors and to support e.g. strip lighting diagrammatically shown at 66, whilst the lower part 67 has a shape enabling it to hold in place the panel and the detachable coverings covering the latter. Post 3 facing said upper hollow member obviously has not specifically designated openings permitting the passage of electrical conductors, as well as the connection of said conductors to conductors in other panels or in post 3.

Figure 7:
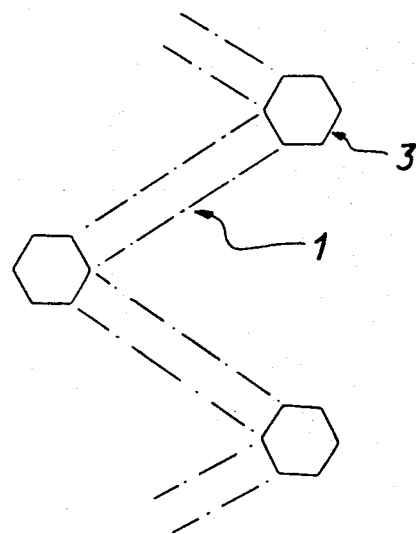
FIG. 7 another arrangement of the panels and posts.

FIG. 7 diagrammatically shows another relative arrangement of panels 1 and posts 3. According to this arrangement, the adjacent panels of each post are no longer in the extension of one another or at right angles, but instead form an angle exceeding e.g. 90°.

Figure 8:
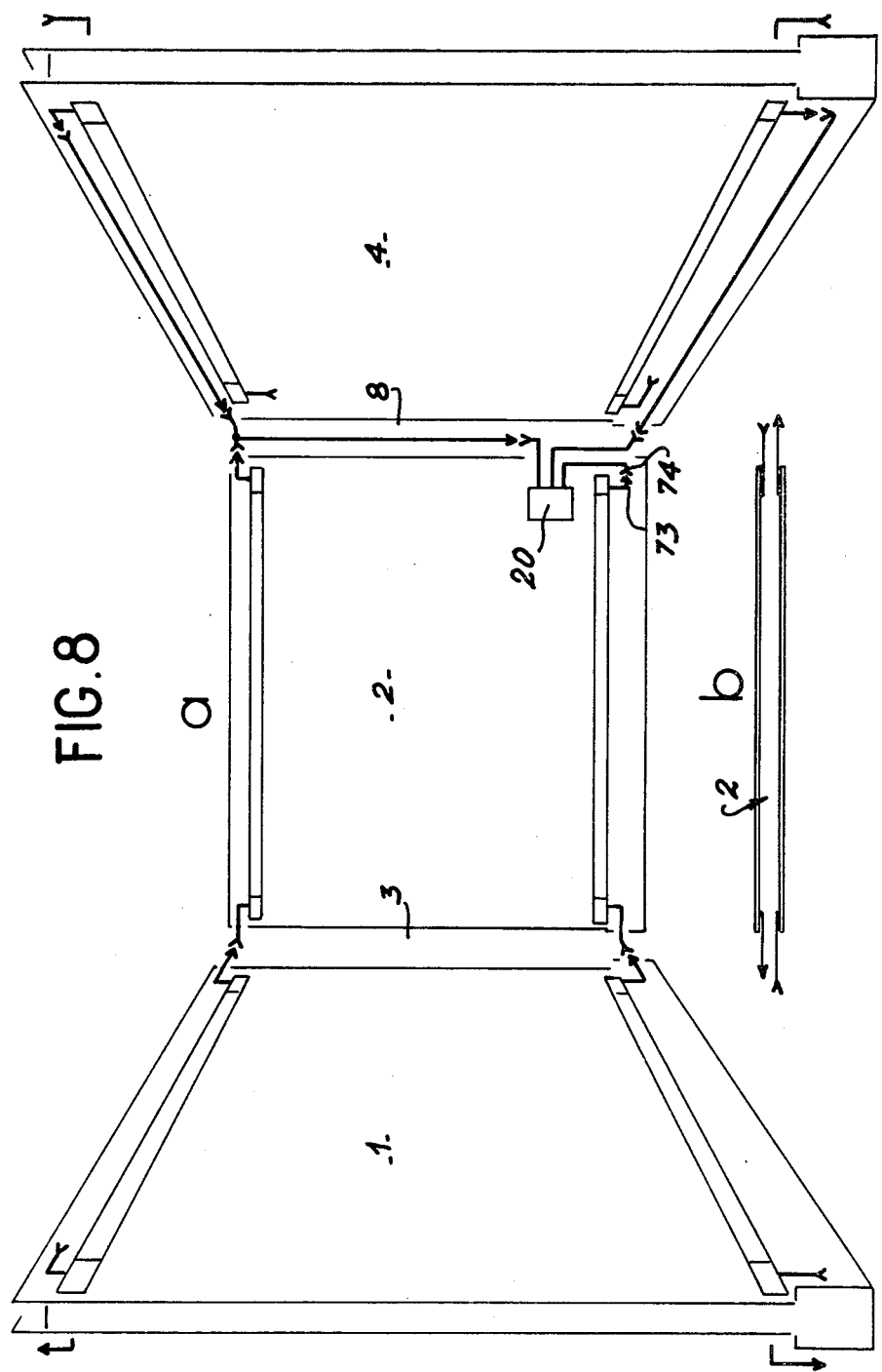
FIG. 8 diagrammatically and in exemplified manner, the different electrical connectors.

FIG. 8 diagrammatically shows at a perspective in which is shown in exemplified manner the connections between the different electrical conductors of several panels and at b a diagrammatic plan view of one of these panels with the main conductors contained therein. These panels are designated 1, 2 and 4 in FIG. 8. The plugs are shown symbolically and designated 73, whilst the sockets are shown symbolically and designated 74. The drawing also shows a switchbox 20 to which electric power is supplied by a not shown line. The conductors leaving this switchbox have terminal sockets 74, which can be connected to plug 73, which are themselves connected either to conductors located in the base hollow members or to conductors located in a post. The other ends of the conductors located in base hollow members or in the lower part of the pillar are eliminated by sockets. As shown at b in the plan view of partition 2, the male connector is located to the right of the panel when the latter is viewed from the front, whilst the female connector is positioned to the left thereof. Thus, the partitions are identical and their positions can be reversed. In addition, the modular assembly complies with the electrical safety standards, because the power is always supplied in the female connector. The same arrangement of connectors can obviously be used for a telephone line.

Obviously, the drawings do not show the connection means for the different pipes, which are positioned in the same way as the electrical conductors in the lower part of post 3 and at the ends of the base hollow members.

It is obvious that the means used in the modular assembly according to the invention could be replaced by equivalent means without passing beyond the scope of the invention.

The panels, posts, hollow members, etc. can have random dimensions, as a function of the dimensions of the stands and the panels which are in one-piece.

What is claimed is:

1. A modular assembly for the construction of an exhibition stand on an installation area comprising at least one panel having faces and a base, the panel being fixed to at least one post having a base, the panel and post resting by their bases on an installation area, wherein the base of the panel rests on the installation area by means of at least one hollow profiled member whose base is fixed to the panel and can receive at least one pipe carrying a fluid, as well as electrical signal conductors, whereby at least the base of the post is hollow facing the base hollowed profile member of the panel to permit connection to pipes of other panels or the connection of said pipes to other pipes, as well as the connection between conductors of other panels or the connection of these conductors to other conductors, this assembly further comprising at least one upper hollow profiled member located in the upper part of the panel in order to at least permit the passage of electrical signal conductors, the post being a hollow member in order to at least permit the passage of electrical signal conductors, as well as connections between conductors contained in said post and conductors contained in the base hollow members and conductors contained in the upper hollow members, and wherein the base hollow member comprises at least one partition subdividing the hollow member into a first lower part housing only the said pipes and a second upper part housing only the said electrical conductors, the base hollow member further comprising at least one vertical partition in the upper and lower parts thereof in order to separate the pipes and electrical conductors relative to each of the faces of the panel.

2. A modular assembly according to claim 1, wherein the pipes and electrical conductors are fitted in the hollow members and post before installing the modular assembly on the installation area.

3. A modular assembly according to claim 2, wherein it also comprises assembly means for each panel in order to assemble each panel with a post and rapid connection means for the conductors and for connecting the pipes at the end of each panel.

* * * * *